(12) United States Patent
Hayashi et al.

(10) Patent No.: US 11,317,627 B2
(45) Date of Patent: May 3, 2022

(54) SOYBEAN DISEASE CONTROL COMPOSITION AND SOYBEAN DISEASE CONTROL METHOD

(71) Applicant: ISHIHARA SANGYO KAISHA, LTD., Osaka (JP)

(72) Inventors: Hiroyuki Hayashi, Osaka (JP); Koudai Yamamoto, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 109 days.

(21) Appl. No.: 16/677,714

(22) Filed: Nov. 8, 2019

(65) Prior Publication Data

US 2020/0068889 A1   Mar. 5, 2020

Related U.S. Application Data

(62) Division of application No. 15/736,633, filed as application No. PCT/JP2016/067730 on Jun. 15, 2016, now Pat. No. 10,791,737.

(30) Foreign Application Priority Data

Jun. 15, 2015   (JP) .................................. 2015-119889

(51) Int. Cl.
| | | |
|---|---|---|
| *A01N 43/40* | (2006.01) | |
| *A01N 43/56* | (2006.01) | |
| *A01N 43/653* | (2006.01) | |

(52) U.S. Cl.
CPC ............ *A01N 43/40* (2013.01); *A01N 43/56* (2013.01); *A01N 43/653* (2013.01)

(58) Field of Classification Search
CPC ....... A01N 43/40; A01N 43/56; A01N 43/653
See application file for complete search history.

(56) References Cited

U.S. PATENT DOCUMENTS

| | | | | |
|---|---|---|---|---|
| 2003/0206968 A1* | 11/2003 | Cotter | ................ | A01N 43/90 424/638 |
| 2007/0010401 A1* | 1/2007 | Noon | ................ | A01N 57/20 504/165 |
| 2010/0216640 A1* | 8/2010 | Tobler | ................ | A01N 57/20 504/208 |
| 2014/0024532 A1 | 1/2014 | Tobler et al. | | |
| 2014/0039027 A1* | 2/2014 | Gortz | ................ | A01N 43/56 514/406 |
| 2016/0192655 A1 | 7/2016 | Tobler et al. | | |
| 2017/0202220 A1 | 7/2017 | Tobler et al. | | |
| 2018/0168156 A1 | 6/2018 | Hayashi et al. | | |

FOREIGN PATENT DOCUMENTS

| | | | |
|---|---|---|---|
| CN | 101984822 A | 3/2011 | |
| CN | 102119690 A | 7/2011 | |
| CN | 102119691 A | 7/2011 | |
| CN | 102119693 A | 7/2011 | |
| CN | 103081917 A | 5/2013 | |
| CN | 104206387 A | 12/2014 | |
| DK | 2014 00182 U1 | 12/2014 | |
| JP | 2010-524990 A | 7/2010 | |
| WO | 2012/110464 A1 | 8/2012 | |
| WO | 2014/016279 A1 | 1/2014 | |
| WO | 2014/029697 A1 | 2/2014 | |
| WO | WO-2014029697 A1 * | 2/2014 | ............ A01N 43/54 |
| WO | 2015/062358 A1 | 5/2015 | |
| WO | 2015/078216 A1 | 6/2015 | |

OTHER PUBLICATIONS

Search Report dated Sep. 20, 2016 by the International Searching Authority in counterpart International Application No. PCT/2016/067730 (PCT/ISA/210).

Written Opinion dated Sep. 20, 2016 by the International Searching Authority in counterpart International Application No. PCT/2016/067730 (PCT/ISA/237).

* cited by examiner

*Primary Examiner* — Jared Barsky
(74) *Attorney, Agent, or Firm* — Sughrue Mion, PLLC

(57) ABSTRACT

There are provided a soybean disease control composition containing, as active ingredients, (a) fluazinam or a salt thereof and (b) at least one fungicide selected from the group consisting of carboxamide-based compounds and azole-based compounds; and a method for controlling a soybean disease, which includes applying the soybean disease control composition to a soybean plant or soil.

4 Claims, No Drawings

SOYBEAN DISEASE CONTROL COMPOSITION AND SOYBEAN DISEASE CONTROL METHOD

CROSS REFERENCE TO RELATED APPLICATIONS

This is a divisional of application Ser. No. 15/736,633 filed Dec. 14, 2017, which is the National Stage of PCT/JP2016/067730 filed Jun. 15, 2016, which claims benefit of Japanese Patent Application No. 2015-119889 filed Jun. 15, 2015; the above noted prior applications are all hereby incorporated by reference.

TECHNICAL FIELD

The present invention relates to a soybean disease control composition useful as an agricultural and horticultural fungicide having a remarkably improved control effect against soybean diseases and a method for controlling a soybean disease using the composition.

BACKGROUND ART

Soybean is a crop widely cultivated in the world. Particularly, it has been produced in USA, Brazil, and Argentina in a large scale and the production amount in these three countries has reached 80% of that in the world. In recent years, the damage caused by soybean rust (*Phakopsora pachyrhizi*) has become serious in Brazil, Argentina, and neighboring countries. The soybean rust is known as a disease that results in serious loss ranging as high as from 10 to 90% of the production amount and thus a countermeasure for controlling it is urgently required.

Patent Literature 1 discloses a fungicidal composition composed of (A) fluazinam and (B) an azole-based compound such as myclobutanil, diphenoconazole, or tebuconazole and effects of the composition on powdery mildew of vegetables and grapes.

Patent Literature 2 discloses a ternary mixed use of a pyrazole-carboxamide derivative including pydiflumetofen and other numerous compounds each having a fungicidal activity.

Patent Literature 3 discloses a ternary mixed agent of a respiratory chain complex II inhibitor such as boscalid, a respiratory chain complex III Qo site inhibitor such as pyraclostrobin, and fluazinam.

CITED REFERENCES

Patent Literatures

Patent Literature 1: CN-A-101984822
Patent Literature 2: WO2014/016279
Patent Literature 3: WO2014/029697

DISCLOSURE OF THE INVENTION

Problems to be Solved by the Invention

However, in Patent Literature 1, there is no specific description about a soybean disease control composition and a soybean disease. Patent Literature 2 does not disclose a fungicidal composition composed of fluazinam and a carboxamide-based compound or an azole-based compound and a fungicidal effect on a soybean disease. In Patent Literature 3, there is no specific description that an excellent effect is exhibited on soybean rust.

The active ingredients of the soybean disease control composition of the present invention sometimes do not show a practically sufficient control effect on soybean diseases depending on an applying situation, since it has an insufficient effect on particular soybean diseases or its residual effectiveness is relatively short when used solely.

An object of the present invention is to provide a soybean disease control composition having a remarkably improved control effect on soybean diseases by combining fungicides and a method for controlling a soybean disease.

Means for Solving the Problems

As a result of studies for solving the aforementioned problems, the present inventors have found that, when (a) fluazinam or a salt thereof and (b) at least one fungicide selected from the group consisting of carboxamide-based compounds and azole-based compounds are used in combination, an unexpected excellent fungicidal effect is obtained as compared with the case of using each compound solely, and thus have accomplished the present invention.

That is, the present invention relates to a soybean disease control composition containing, as active ingredients, (a) fluazinam or a salt thereof (hereinafter, it is sometimes simply referred to as ingredient (a)) and (b) at least one fungicide selected from the group consisting of carboxamide-based compounds and azole-based compounds (hereinafter, they are sometimes simply referred to as ingredient (b) in a lump). Moreover, the present invention also relates to a method for controlling a soybean disease, which comprises applying the soybean disease control composition to a soybean plant or soil.

Effect of the Invention

The soybean disease control composition of the present invention exhibits an effect more than an additive effect of individual fungicidal effects on a soybean disease, i.e., a synergistic effect. More specifically, even in the case where the ingredient (a) and the ingredient (b) that are active ingredients of the soybean disease control composition of the present invention show only an insufficient control effect on a particular soybean disease when they are used solely, the composition exhibits a synergistic effect on the soybean disease by using them in combination and achieves a practically sufficient control effect.

EMBODIMENTS FOR CARRYING OUT THE INVENTION

The ingredient (a) of the present invention, fluazinam is a compound described in pages 504 to 505 in The Pesticide Manual (16th edition; British Crop Production Council).

Carboxamide-based compounds that are the ingredients (b) of the present invention include tolfenpyrad, fenfuram, carboxin, oxycarboxin, thifluzamide, benzovindiflupyr, bixafen, fluxapyroxad, furametpyr, isopyrazam, penflufen, penthiopyrad, sedaxane, boscalid, and the like. They are all compounds described as fungicides in The Pesticide Manual (16th edition; British Crop Production Council) and SHIBUYA INDEX 17th edition (SHIBUYA INDEX RESEARCH GROUP).

Azole-based compounds that are the ingredients (b) of the present invention include imazalil, oxpoconazole fumarate, pefurazoate, azaconazole, bromuconazole, cyproconazole, diclobutrazol, difenoconazole, epoxiconazole, etaconazole, fenbuconazole, fluquinconazole, furconazole, hexaconazole, imibenconazole, ipconazole, metconazole, myclobutanil, propiconazole, prothioconazole, quinconazole, simeconazole, tebuconazole, tetraconazole, triadimefon, triticonazole, and the like. They are all compounds described as fungicides in The Pesticide Manual (16th edition; British Crop Production Council) and SHIBUYA INDEX 17th edition (SHIBUYA INDEX RESEARCH GROUP).

Of the ingredients (b) of the present invention, preferred are benzovindiflupyr, fluxapyroxad, cyproconazole, epoxiconazole, prothioconazole, and tebuconazole that exhibit a higher synergistic effect when used in combination with the ingredient (a).

The soybean disease control composition of the present invention is useful for controlling soybean diseases. As the soybean diseases, for example, the composition is effective for soybean rust (*Phakopsora pachyrhizi*), downy mildew (*Peronospora manshurica*), stem blight (*Phytophthora sojae*), rot (*Sclerotinia sclerotiorum*), purpura (*Cercospora kikuchii*), Bird's eye rot (*Elsinoe glycines*), black spot disease (*Diaporthe phaseolorum*), Southern blight (*Sclerotium rolfsii*), damping-off (*Fusarium oxysporum*), anthracnose (*Colletotrichum truncatum, C. trifolii, Glomerella glycines, Gloeosporium* sp.), gray mold (*Botrytis cinerea*), leaf rot (*Rhizoctonia solani*), and the like. Therefore, the soybean disease control composition of the present invention is useful as a soybean disease control agent containing the composition.

The ingredient (a) and the ingredient (b) constituting the soybean disease control composition of the present invention may be mixed with various adjuvants in the same manner as conventional agricultural chemicals, and used in the form of a formulation such as a dust, granules, water-dispersible granules, a wettable powder, a water-based suspension, an oil-based suspension, water-soluble granules, an emulsifiable concentrate, a soluble concentrate, a paste, an aerosol, or an ultra low-volume formulation. However, so long as it is suitable for the purpose of the present invention, it may be formulated into any type of formulation which is commonly used in this field. Such adjuvants to be used on the formulation include solid carriers such as diatomaceous earth, slaked lime, calcium carbonate, talc, white carbon, kaolin, bentonite, a mixture of kaolinite and sericite, clay, sodium carbonate, sodium bicarbonate, mirabilite, zeolite, and starch; solvents such as water, toluene, xylene, solvent naphtha, dioxane, acetone, isophorone, methyl isobutyl ketone, chlorobenzene, cyclohexane, dimethyl sulfoxide, dimethylformamide, dimethylacetamide, N-methyl-2-pyrrolidone, and alcohol; anionic surfactants and spreaders such as a salt of fatty acid, a benzoate salt, an alkylsulfosuccinate salt, a dialkylsulfosuccinate salt, a polycarboxylate salt, a salt of alkylsulfuric acid ester, an alkyl sulfate salt, an alkylaryl sulfate salt, an alkyl diglycol ether sulfate salt, a salt of alcohol sulfuric acid ester, an alkyl sulfonate salt, an alkylaryl sulfonate salt, an aryl sulfonate salt, a lignin sulfonate salt, an alkyldiphenyl ether disulfonate salt, a polystyrene sulfonate salt, a salt of alkylphosphoric acid ester, an alkylaryl phosphate salt, a styrylaryl phosphate salt, a salt of polyoxyethylene alkyl ether sulfuric acid ester, a polyoxyethylene alkylaryl ether sulfate salt, a salt of polyoxyethylene alkylaryl ether sulfuric acid ester, a polyoxyethylene alkyl ether phosphate salt, a salt of polyoxyethylene alkylaryl phosphoric acid ester, and a salt of a condensate of naphthalene sulfonate-formalin; nonionic surfactants and spreaders such as a sorbitan fatty acid ester, a glycerin fatty acid ester, a fatty acid polyglyceride, a fatty acid alcohol polyglycol ether, acetylene glycol, acetylene alcohol, an oxyalkylene block polymer, a polyoxyethylene alkyl ether, a polyoxyethylene alkylaryl ether, a polyoxyethylene styrylaryl ether, a polyoxyethylene glycol alkyl ether, a polyoxyethylene fatty acid ester, a polyoxyethylene sorbitan fatty acid ester, a polyoxyethylene glycerin fatty acid ester, a polyoxyethylene hydrogenated castor oil, and a polyoxypropylene fatty acid ester; and vegetable and mineral oils such as olive oil, kapok oil, castor oil, palm oil, camellia oil, coconut oil, sesame oil, corn oil, rice bran oil, peanut oil, cottonseed oil, soybean oil, rapeseed oil, linseed oil, tung oil, and liquid paraffin. Such adjuvants may be selected for use among those known in this field, so long as such selection does not depart from the purpose of the present invention. Further, it is possible to use commonly employed various additives such as a filler, a thickener, an anti-settling agent, an anti-freezing agent, a dispersion stabilizer, a phytotoxicity reducing agent, an anti-mold agent, etc. The blend ratio of the ingredients (a) and (b) to various additives is usually from 0.005:99.995 to 95:5, preferably from 0.2:99.8 to 90:10, in weight ratio. In actual use of such a formulation, it may be used as it is, or after it is diluted with a diluting agent such as water to a predetermined concentration and, as a case requires, various spreaders are added.

Additionally, the soybean disease control composition of the present invention may be used in combination with other agricultural chemicals, for example, a fungicide, an insecticide, a miticide, a nematicide, a soil pesticide, an antivirus agent, an attractant, a herbicide, and a plant growth regulating agent. In this case, a further excellent effect may be exhibited.

The active ingredient compounds (common names or test codes of the Japan Plant Protection Association) of the fungicides in such other agricultural chemicals may, for example, be appropriately selected from the following compound groups. Even in the case where particular description is absent, when various structural isomers such as salts, alkyl esters, and optical isomers are present for these compounds, they are included as a matter of course.

Anilinopyrimidine-based compounds such as mepanipyrim, pyrimethanil, and cyprodinil;

Triazolopyrimidine-based compounds such as 5-chloro-7-(4-methylpiperidin-1-yl)-6-(2,4,6-trifluorophenyl)[1,2,4]triazolo[1,5-a]pyrimidine;

Azole-based compounds such as triflumizole, triadimenol, bitertanol, diniconazole, penconazole, flusilazole, prochloraz, flutriafol, ipfentrifluconazole, and mefentrifluconazole;

Quinoxaline-based compounds such as quinomethionate;

Dithiocarbamate-based compounds such as maneb, zineb, mancozeb, polycarbamate, metiram, propineb, and thiram;

Organochlorine-based compounds such as fthalide, chlorothalonil, and quintozene;

Imidazole-based compounds such as benomyl, thiophanate-methyl, carbendazim, thiabendazole, and fuberiazole;

Cyanoacetamide-based compounds such as cymoxanil;

Anilide-based compounds such as metalaxyl, metalaxyl-M (another name: mefenoxam), oxadixyl, ofurace, benalaxyl, benalaxyl-M (another name: kiralaxyl, chiralaxyl), furalaxyl, cyprofuram, isotianil, and tiadinil;

Sulfamide-based compounds such as dichlofluanid;

Copper-based compounds such as cupric hydroxide, oxine copper, anhydrous copper sulfate, copper nonylphenolsulfonate, 8-hydroxyquinoline copper, and dodecylbenzenesulfonic acid bisethylenediamine copper complex salt (II) (another name: DBEDC);

Organophosphorus-based compounds such as fosetyl-Al, tolclofos-Methyl, edifenphos, and iprobenfos;

Phthalimide-based compounds such as captan, captafol, and folpet;

Dicarboxyimide-based compounds such as procymidone, iprodione, and vinclozolin;

Benzanilide-based compounds such as flutolanil, mepronil, and benodanil;

Amide-based compounds such as silthiopham, fenoxanil, and pydiflumetofen;

Benzamide-based compounds such as fluopyram and zoxamide;

Piperadine-based compounds such as triforine;

Pyridine-based compounds such as pyrifenox and pyrisoxazole;

Carbinol-based compounds such as fenarimol and nuarimol;

Piperidine-based compounds such as fenpropidin;

Morpholine-based compounds such as fenpropimorph and tridemorph;

Organotin-based compounds such as fentin hydroxide and fentin acetate;

Urea-based compounds such as pencycuron;

Carboxylic acid amide-based compounds such as dimethomorph, flumorph, pyrimorph, iprovalicarb, benthiavalicarb-isopropyl, and mandipropamid;

Phenylcarbamate-based compounds such as diethofencarb;

Cyanopyrrole-based compounds such as fludioxonil and fenpiclonil;

Strobilurin-based compounds such as azoxystrobin, kresoxim-methyl, metominostrobin, trifloxystrobin, picoxystrobin, oryzastrobin, dimoxystrobin, pyraclostrobin, fluoxastrobin, Enestroburin, Pyraoxystrobin, Pyrametostrobin, coumoxystrobin, enoxastrobin, fenaminstrobin, flufenoxystrobin, triclopyricarb, and mandestrobin;

Oxazolidinone-based compounds such as famoxadone;

Thiazolecarboxamide-based compounds such as ethaboxam;

Imidazolinone-based compounds such as fenamidone;

Hydroxyanilide-based compounds such as fenhexamid;

Benzenesulfonamide-based compounds such as flusulfamide;

Oxime ether-based compounds such as cyflufenamid;

Anthraquinone-based compounds such as dithianon;

Crotonic acid-based compounds such as meptyldinocap;

Antibiotics such as validamycin, kasugamycin, and polyoxins;

Guanidine-based compounds such as iminoctadine and dodine;

Quinoline-based compounds such as tebufloquin, quinoxyfen, and quinofumelin;

Thiazolidine-based compounds such as flutianil;

Carbamate-based compounds such as propamocarb hydrochloride and tolprocarb;

Sulfonamide-based compounds such as amisulbrom and cyazofamid;

Aryl phenyl ketone-based compounds such as metrafenone and pyriofenone;

Pyrazole-based compounds such as pyraziflumid;

Sulfur-based compounds such as sulfur and lime sulfur;

As other compounds, there may be mentioned tricyclazole, probenazole, pyribencarb, isoprothiolane, pyroquilon, diclomezine, chloropicrin, dazomet, metam-sodium, nicobifen, diclocymet, proquinazid, mandipropamid, fluopicolide, carpropamid, ferimzone, spiroxamine, fenpyrazamine, ametoctradin, oxathiapiprolin, picarbutrazox, dipymetitrone, SB-4303, BAF-1107, MIF-1002, KUF-1411, BAF-1120, BAF-1510, BAF-1511, NF-180, S-2399, SYJ-264, SYJ-259, AKD-5195, BYF-1303, and the like;

Microorganism fungicides such as *Bacillus amyloliqefaciens* strain QST713, *Bacillus amyloliqefaciens* strain FZB24, *Bacillus amyloliqefaciens* strain MBI600, *Bacillus amyloliqefaciens* strain D747, *Pseudomonas fluorescens, Bacillus subtilis*, and Trichoderma atroviride SKT-1; and Plant extracts such as Tea tree oil.

The active ingredient compounds (common names or test codes of the Japan Plant Protection Association) of the insecticides, miticides, nematicides, or soil pesticides, i.e., pesticides in such other agricultural chemicals may, for example, be appropriately selected from the following compound groups. Even in the case where particular description is absent, when various structural isomers such as salts, alkyl esters, and optical isomers are present for these compounds, they are included as a matter of course.

Organic phosphate ester-based compounds such as profenofos, dichlorvos, fenamiphos, fenitrothion, EPN((RS)—(O-ethyl O-4-nitrophenyl phenylphosphonothioate)), diazinon, chlorpyrifos, chlorpyrifos-methyl, acephate, prothiofos, fosthiazate, cadusafos, disulfoton, isoxathion, isofenphos, ethion, etrimfos, quinalphos, dimethylvinphos, dimethoate, sulprofos, thiometon, vamidothion, pyraclofos, pyridaphenthion, pirimiphos-methyl, propaphos, phosalone, formothion, malathion, tetrachlorvinphos, chlorfenvinphos, cyanophos, trichlorfon, methidathion, phenthoate, oxydeprofos (another name: ESP), azinphos-methyl, fenthion, heptenophos, methoxychlor, parathion, phosphocarb, demeton-S-methyl, monocrotophos, methamidophos, imicyafos, parathion-methyl, terbufos, phosphamidon, phosmet, and phorate;

Carbamate-based compounds such as carbaryl, propoxur, aldicarb, carbofuran, thiodicarb, methomyl, oxamyl, ethiofencarb, pirimicarb, fenobucarb, carbosulfan, benfuracarb, bendiocarb, furathiocarb, isoprocarb, metolcarb, xylylcarb, XMC (3,5-xylyl methylcarbamate), and fenothiocarb;

Nereistoxin derivatives such as cartap, thiocyclam, thiocyclam oxalate, thiocyclam hydrochloride, bensultap, thiosultap, monosultap (another name: thiosultap-monosodium), bisultap (another name: thiosultap-disodium), and polythialan;

Organochlorine-based compounds such as dicofol, tetradifon, endosulfan, dienochlor, and dieldrin;

Organometallic compounds such as fenbutatin oxide and cyhexatin;

Pyrethroid-based compounds such as fenvalerate, permethrin, cypermethrin, alpha-cypermethrin, zeta-cypermethrin, theta-cypermethrin, beta-cypermethrin, deltamethrin, cyhalothrin, gamma-cyhalothrin, lambda-cyhalothrin, tefluthrin, kappa-tefluthrin, ethofenprox, flufenprox, cyfluthrin, beta-cyfluthrin, fenpropathrin, flucythrinate, fluvalinate, cycloprothrin, pyrethrins, esfenvalerate, tetramethrin, resmethrin, protrifenbute, bifenthrin, kappa-bifenthrin, acrinathrin, allethrin, tau-fluvalinate, tralomethrin, profluthrin, metofluthrin, epsilon-metofluthrin, heptafluthrin, phenothrin, flumethrin, momfluorothrin, epsilon-momfluorothrin, silafluofen, and chloroprallethrin;

Benzoylurea-based compounds such as diflubenzuron, chlorfluazuron, teflubenzuron, flufenoxuron, lufenuron, novaluron, triflumuron, hexaflumuron, bistrifluron, noviflumuron, and fluazuron;

Juvenile hormone-like compounds such as methoprene, pyriproxyfen, fenoxycarb, and diofenolan;

Pyridazinone-based compounds such as pyridaben;

Pyrazole-based compounds such as fenpyroximate, fipronil, tebufenpyrad, ethiprole, acetoprole, pyrafluprole, pyriprole, cyenopyrafen, pyflubumide, and flufiprole;

Neonicotinoid-based compounds such as imidacloprid, nitenpyram, acetamiprid, thiacloprid, thiamethoxam, clothianidin, nidinotefuran, dinotefuran, and nithiazine;

Hydrazine-based compounds such as tebufenozide, methoxyfenozide, chromafenozide, and halofenozide;

Pyridine-based compounds such as pyridalyl and flonicamid;

Cyclic keto-enol-based compounds such as spirodiclofen, spiromesifen, and spirotetramat;

Strobilurin-based compounds such as fluacrypyrim and pyriminostrobin;

Pyrimidinamine-based compounds such as flufenerim and pyrimidifen;

Organosulfur compounds such as malathion;

Urea-based compound such as flufenoxuron;

Triazine-based compound such as cyromazine;

Hydrazone-based compound such as hydramethylnon;

Diamide-based compound such as flubendiamide, chlorantraniliprole, cyantraniliprole, cyclaniliprole, tetraniliprole, broflanilide, and cyhalodiamide;

Thiourea-based compound such as diafenthiuron and chloromethiuron;

Formamidine-based compounds such as amitraz, chlordimeform, and chloromebuform;

And, as other compounds, there may be mentioned compounds such as buprofezin, hexythiazox, triazamate, pymetrozine, chlorfenapyr, indoxacarb, acequinocyl, etoxazole, 1,3-dichloropropene, benclothiaz, bifenazate, propargite, clofentezine, metaflumizone, cyflumetofen, pyrifluquinazone, fenazaquin, amidoflumet, sulfluramid, hydramethylnon, metaldehyde, sulfoxaflor, fluensulfone, verbutin, dicloromezotiaz, triflumezopyrim, fluhexafon, tioxazafen, afidopyropen, flometoquin, flupyradifurone, fluazaindolizine, and fluxametamide.

Moreover, the composition of the present invention may be applied in combination with the following compounds.

Microorganism agricultural chemicals such as crystal protein toxins, insect pathogenic virus agents, insect pathogenic filamentous fungus agents, nematode pathogenic filamentous fungus agents produced by *Bacillus thuringiensis* aizawai, *Bacillus thuringiensis* kurstaki, *Bacillus thuringiensis* israelensis, *Bacillus thuringiensis* japonensis, *Bacillus thuringiensis* tenebrionis, or *Bacillus thuringiensis*;

Antibiotics and semi-synthetic antibiotics such as avermectin, emamectin Benzoate, milbemectin, milbemycin, spinosad, ivermectin, lepimectin, abamectin, emamectin, and spinetoram;

Natural products such as azadirachtin, rotenone, and ryanodine;

Repellents such as deet; and

Physical pest control agents such as paraffin oil and mineral oil.

In the soybean disease control composition of the present invention, a proper mixing weight ratio of the ingredient (a) to the ingredient (b) is preferably from 1:10,000 to 10,000:1, more preferably from 1:1,000 to 1,000:1, and particularly preferably from 1:100 to 100:1.

The present invention also includes a method for controlling a soybean disease, which comprises applying the soybean disease control composition of the present invention to a soybean plant or soil. The use concentration of the soybean disease control composition of the present invention varies depending on objective cultivars, method of use, formulation, dose, and the like and cannot be generally defined.

However, in the case of foliage treatment, it is prepared so that the ingredient (a) will be usually from 10,000 to 0.01 ppm, preferably from 1,000 to 0.1 ppm, more preferably from 500 to 1 ppm and the ingredient (b) will be usually from 10,000 to 0.01 ppm, preferably from 5,000 to 1 ppm, more preferably from 1,000 to 1 ppm. In the case of soil treatment, it is prepared so that the ingredient (a) will be usually from 10,000 to 1 g/ha, preferably from 5,000 to 5 g/ha, more preferably from 1,000 to 10 g/ha and the ingredient (b) will be usually from 10,000 to 1 g/ha, preferably from 5,000 to 5 g/ha, more preferably 1,000 to 10 g/ha.

The various formulations or diluted ones thereof of the soybean disease control composition of the present invention may be applied by an application method which is commonly conducted, i.e., spreading (such as spreading, spraying, misting, atomizing, grain diffusing, or application on water surface, for example), soil application (such as mixing or irrigation), surface application (such as coating, dust coating, or covering), or the like. Further, it may be applied also by so-called ultra low-volume application method. In this method, the formulation may contain 100% of the active ingredient.

The following will describe desirable embodiments of the present invention.

[1] A soybean disease control composition comprising, as active ingredients, (a) fluazinam or a salt thereof and (b) at least one fungicide selected from the group consisting of carboxamide-based compounds and azole-based compounds.

[2] The soybean disease control composition described in [1], wherein the carboxamide-based compound is tolfenpyrad, fenfuram, carboxin, oxycarboxin, thifluzamide, benzovindiflupyr, bixafen, fluxapyroxad, furametpyr, isopyrazam, penflufen, penthiopyrad, sedaxane, or boscalid.

[3] The soybean disease control composition described in [1] or [2], wherein the azole-based compound is imazalil, oxpoconazole fumarate, pefurazoate, azaconazole, bromuconazole, cyproconazole, diclobutrazol, difenoconazole, epoxiconazole, etaconazole, fenbuconazole, fluquinconazole, furconazole, hexaconazole, imibenconazole, ipconazole, metconazole, myclobutanil, propiconazole, prothioconazole, quinconazole, simeconazole, tebuconazole, tetraconazole, triadimefon, or triticonazole.

[4] The soybean disease control composition described in any one of [1] to [3], wherein the carboxamide-based compound is benzovindiflupyr or fluxapyroxad.

[5] The soybean disease control composition described in any one of [1] to [4], wherein the azole-based compound is cyproconazole, epoxiconazole, prothioconazole, or tebuconazole.

[6] The soybean disease control composition described in any one of [1] to [5], wherein the mixing weight ratio of (a) fluazinam or the salt thereof to (b) the fungicide is from 1:10,000 to 10,000:1.

[7] A method for controlling a soybean disease, which comprises applying a soybean disease control composition containing, as active ingredients, (a) fluazinam or a salt thereof and (b) at least one fungicide selected from the group consisting of carboxamide-based compounds and azole-based compounds to a soybean plant or soil.

[8] The method for controlling a soybean disease described in [7], wherein the carboxamide-based compound is tolfenpyrad, fenfuram, carboxin, oxycarboxin, thifluzamide, benzovindiflupyr, bixafen, fluxapyroxad, furametpyr, isopyrazam, penflufen, penthiopyrad, sedaxane, or boscalid.

[9] The method for controlling a soybean disease described in [7] or [8], wherein the azole-based compound is imazalil, oxpoconazole fumarate, pefurazoate, azaconazole, bromuconazole, cyproconazole, diclobutrazol, difenoconazole, epoxiconazole, etaconazole, fenbuconazole, fluquinconazole, furconazole, hexaconazole, imibenconazole, ipconazole, metconazole, myclobutanil, propiconazole, prothioconazole, quinconazole, simeconazole, tebuconazole, tetraconazole, triadimefon, or triticonazole.

[10] The method for controlling a soybean disease described in any one of [7] to [9], wherein the carboxamide-based compound is benzovindiflupyr or fluxapyroxad.

[11] The method for controlling a soybean disease described in any one of [7] to [10], wherein the azole-based compound is cyproconazole, epoxiconazole, prothioconazole, or tebuconazole.

[12] The method for controlling a soybean disease described in any one of [7] to [11], wherein the soybean disease is rust.

EXAMPLES

Test Examples relevant to the present invention will be described in the following but they should not be construed as limiting the present invention.

Test Example 1: Test on Spore Germination Inhibition Against Soybean Rust Fungus (*Phakopsora pachyrhizi*)

A spore suspension of soybean rust fungus was added to an aqueous chemical solution prepared so as to contain each test compound in a predetermined concentration and the whole was kept in a moist chamber at 25° C. for 5 hours. Thereafter, the presence of spore germination was investigated using a microscope, the spore germination rate was determined, and the spore germination inhibition rate was determined according to the following calculation formula. The results are shown in Tables 1 to 6.

Spore germination inhibition rate=$(1-a/b) \times 100$ a: spore germination rate in treated section, b: spore germination rate in untreated section Colby's formula=$(X+Y)-XY/100$ X: spore germination inhibition rate in single use of ingredient (a)

Y: spore germination inhibition rate in single use of ingredient (b)

Based on the obtained spore germination inhibition rate, the theoretical value (spore germination inhibition rate) was calculated using the Colby's formula. The theoretical value according to the Colby's formula was shown in brackets ( ) in Tables 1 to 6.

In the case where the experimental value is higher than the theoretical value, the composition of the present invention has a synergistic effect on soybean rust fungus.

TABLE 1

| Cyproconazole | Fluazinam | |
|---|---|---|
| | 0.1 ppm | 0 ppm |
| 0.1 ppm | 39% (34%) | 9% |
| 0 ppm | 27% | |

Spore germination rate in untreated section: 77.5%

TABLE 2

| Epoxiconazole | Fluazinam | |
|---|---|---|
| | 0.1 ppm | 0 ppm |
| 0.1 ppm | 48% (30%) | 5% |
| 0.01 ppm | 34% (28%) | 1% |
| 0 ppm | 27% | |

Spore germination rate in untreated section: 77.5%

TABLE 3

| Prothioconazole | Fluazinam | |
|---|---|---|
| | 0.1 ppm | 0 ppm |
| 0.1 ppm | 100% (92%) | 89% |
| 0.01 ppm | 59% (54%) | 37% |
| 0 ppm | 27% | |

Spore germination rate in untreated section: 77.5%

TABLE 4

| Tebuconazole | Fluazinam | |
|---|---|---|
| | 0.1 ppm | 0 ppm |
| 0.1 ppm | 99% (92%) | 88% |
| 0.01 ppm | 45% (36%) | 12% |
| 0 ppm | 27% | |

Spore germination rate in untreated section: 77.5%

TABLE 5

| Benzovindiflupyr | Fluazinam | |
|---|---|---|
| | 1 ppm | 0 ppm |
| 1 ppm | 100% (86%) | 52% |
| 0.1 ppm | 98% (84%) | 45% |
| 0 ppm | 71% | |

Spore germination rate in untreated section: 65%

TABLE 6

| Fluxapyroxad | Fluazinam | |
|---|---|---|
| | 1 ppm | 0 ppm |
| 1 ppm | 99% (83%) | 41% |
| 0 ppm | 71% | |

Spore germination rate in untreated section: 65%

Test Example 2: Test on Mycelial Growth Inhibition Effect Against Soybean *Rhizoctonia* Rot (*Rhizoctonia solani*)

A colony (4 mmϕ) obtained by preculture was inoculated to PSA containing a chemical agent of a predetermined concentration and, after culture at a room temperature of 20° C. for 2 days, the diameter of the grown colony was measured to determine a mycelial growth inhibition rate. The results are shown in Tables 7 to 11.

Mycelial growth inhibition rate=$(1-A/B) \times 100$

A: diameter of colony in treated section, B: diameter of colony in untreated section Colby's formula=$(X+Y)-XY/100$ X: mycelial growth inhibition rate in single use of ingredient (a)
Y: mycelial growth inhibition rate in single use of ingredient (b)

Based on the obtained experimental value of the mycelial growth inhibition rate, the theoretical value of the mycelial growth inhibition rate was calculated using the Colby's formula. The theoretical value according to the Colby's formula was shown in brackets ( ) in Tables 7 to 11.

In the case where the experimental value is higher than the theoretical value, the composition of the present invention has a synergistic effect on *Rhizoctonia solani*.

TABLE 7

| | Fluazinam | | |
|---|---|---|---|
| Cyproconazole | 0.01 ppm | 0.001 ppm | 0 ppm |
| 1 ppm | 84% (82%) | 85% (80%) | 80% |
| 0.1 ppm | 48% (43%) | 44% (35%) | 34% |
| 0.01 ppm | 24% (20%) | 27% (9%) | 7% |
| 0 ppm | 14% | 2% | |

TABLE 8

| | Fluazinam | |
|---|---|---|
| Epoxiconazole | 0.01 ppm | 0 ppm |
| 1 ppm | 87% (85%) | 83% |
| 0.1 ppm | 49% (48%) | 39% |
| 0 ppm | 14% | |

TABLE 9

| | Fluazinam | | |
|---|---|---|---|
| Tebuconazole | 0.01 ppm | 0.001 ppm | 0 ppm |
| 1 ppm | 77% (74%) | 84% (70%) | 70% |
| 0.1 ppm | 44% (41%) | 37% (32%) | 31% |
| 0.01 ppm | 37% (29%) | 35% (19%) | 17% |
| 0 ppm | 14% | 2% | |

TABLE 10

| | Fluazinam | | |
|---|---|---|---|
| Benzovindiflupyr | 1 ppm | 0.1 ppm | 0 ppm |
| 0.1 ppm | 100% (97%) | 99% (92%) | 71% |
| 0 ppm | 88% | 73% | |

TABLE 11

| | Fluazinam | | |
|---|---|---|---|
| Fluxapyroxad | 1 ppm | 0.1 ppm | 0 ppm |
| 0.1 ppm | 98% (96%) | 98% (88%) | 42% |
| 0 ppm | 92% | 78% | |

The following will describe Formulation Examples of the present invention, but it should be understood that the amount of formulation, type of formulation, and the like in the present invention are not limited to the described examples alone.

Formulation Example 1

| | |
|---|---|
| (A) Kaolin | 78 parts by weight |
| (B) Condensate of sodium β-naphthalenesulfonate-formalin | 2 parts by weight |
| (C) Polyoxyethylene alkylaryl sulfate | 5 parts by weight |
| (D) Hydrated amorphous silicon dioxide | 15 parts by weight |

A mixture of the above components, an ingredient (a), and an ingredient (b) are mixed in a weight ratio of 8:1:1 to obtain a wettable powder.

Formulation Example 2

| | |
|---|---|
| (A) Ingredient (a) | 0.5 part by weight |
| (B) Ingredient (b) | 0.5 part by weight |
| (C) Bentonite | 20 parts by weight |
| (D) Kaolin | 74 parts by weight |
| (E) Sodium lignin sulfonate | 5 parts by weight |

To the above components, a suitable amount of water required for granulation is added, followed by mixing and granulation to obtain granules.

Formulation Example 3

| | |
|---|---|
| (A) Ingredient (a) | 2 part by weight |
| (B) Ingredient (b) | 3 part by weight |
| (C) Talc | 95 parts by weight |

The above ingredients are uniformly mixed to obtain a dust.

While the present invention has been described in detail and with reference to specific embodiments thereof, it will be apparent to one skilled in the art that various changes and modifications can be made therein without departing from the spirit and scope thereof. The present application is based on Japanese Patent Application No. 2015-119889 filed on Jun. 15, 2015, and the contents are incorporated herein by reference.

What is claimed is:

1. A soybean disease control composition comprising active ingredients, wherein the active ingredients consist of (a) fluazinam or a salt thereof and (b) at least one carboxamide-based compound selected from the group consisting of benzovindiflupyr.

2. The soybean disease control composition according to claim 1, wherein the mixing weight ratio of (a) fluazinam or the salt thereof to (b) the at least one carboxamide-based compound is from 1:10,000 to 10,000:1.

3. A method for controlling a soybean disease, which comprises applying a soybean disease control composition containing active ingredients, wherein the active ingredients consist of (a) fluazinam or a salt thereof and (b) at least one carboxamide-based compound selected from the group consisting of benzovindiflupyr.

4. The method for controlling a soybean disease according to claim 3, wherein the soybean disease is rust.

* * * * *